United States Patent
Levy-Abegnoli et al.

(10) Patent No.: US 12,519,724 B2
(45) Date of Patent: Jan. 6, 2026

(54) INTER-REALM ROUTING WITHIN A SHAFT

(71) Applicant: Cisco Technology, Inc., San Jose, CA (US)

(72) Inventors: Eric Levy-Abegnoli, Valbonne (FR); Pascal Thubert, Roquefort les Pins (FR)

(73) Assignee: Cisco Technology, Inc., San Jose, CA (US)

( * ) Notice: Subject to any disclaimer, the term of this patent is extended or adjusted under 35 U.S.C. 154(b) by 525 days.

(21) Appl. No.: 18/055,450

(22) Filed: Nov. 15, 2022

(65) Prior Publication Data

US 2024/0163211 A1    May 16, 2024

(51) Int. Cl.
H04L 45/74    (2022.01)

(52) U.S. Cl.
CPC .......... H04L 45/74 (2013.01); *H04L 2212/00* (2013.01)

(58) Field of Classification Search
None
See application file for complete search history.

(56) References Cited

U.S. PATENT DOCUMENTS

| | | | |
|---|---|---|---|
| 6,708,219 B1* | 3/2004 | Borella | H04L 61/251 709/230 |
| 7,302,496 B1 | 11/2007 | Metzger | |
| 7,764,686 B1 | 7/2010 | Toebes | |
| 8,379,623 B2* | 2/2013 | Lewis | H04L 12/1836 370/349 |
| 9,014,191 B1* | 4/2015 | Mandal | H04L 45/04 370/392 |
| 9,455,950 B1* | 9/2016 | Li | H04L 61/251 |
| 11,882,203 B2* | 1/2024 | Bashandy | H04L 69/22 |
| 2006/0106941 A1* | 5/2006 | Singhal | H04L 67/56 709/245 |
| 2006/0239266 A1 | 10/2006 | Babbar | |
| 2006/0259639 A1 | 11/2006 | Aken | |
| 2008/0071927 A1* | 3/2008 | Lee | H04L 61/251 709/245 |
| 2012/0020359 A1 | 1/2012 | Jiang | |
| 2013/0259045 A1* | 10/2013 | Johansson | H04L 45/306 370/392 |
| 2014/0056301 A1* | 2/2014 | Hu | H04L 69/22 370/392 |
| 2017/0118043 A1* | 4/2017 | Hao | H04L 61/5061 |

(Continued)

OTHER PUBLICATIONS

"Packet Forwarding and Routing on IPV4 Networks," Oracle.com, Oracle Corporation, 2010, pp. 1-23.

*Primary Examiner* — Lonnie V Sweet

(74) *Attorney, Agent, or Firm* — Polsinelli P.C.

(57) ABSTRACT

Disclosed herein are systems, methods, and computer-readable media for forwarding packets between parallel IPv4 networks that includes encapsulating an IP packet to include an outer header and an inner header. The IP packet is routed to a shaft spanning a subset of addresses within the source realm. Upon reaching the shaft in the source realm, a first swap of the inner header and the outer header of the IP packet is performed. The IP packet is forwarded inside the shaft from the source realm to the destination realm. Upon reaching the destination realm, a second swap of the inner header and the outer header of the IP packet is performed. The IP packet is forwarded in the destination realm to the destination node.

20 Claims, 15 Drawing Sheets

(56) References Cited

U.S. PATENT DOCUMENTS

| | | | |
|---|---|---|---|
| 2019/0104111 A1* | 4/2019 | Cidon | H04L 12/1428 |
| 2020/0177503 A1* | 6/2020 | Hooda | H04L 12/4641 |
| 2021/0051112 A1* | 2/2021 | Wondra | H04L 12/4633 |
| 2022/0345984 A1* | 10/2022 | Patel | H04L 69/22 |

* cited by examiner

INTER-REALM ROUTING WITHIN A SHAFT

BACKGROUND

The present invention relates to data networking and more particularly to routing and addressing.

In recent years, the Internet has undergone enormous expansion including expansion in a number of interconnected devices. Internet routing techniques generally operate on individual packets. Each packet has a destination address specified by the packet sender, and this destination address is used in making forwarding decisions at intermediate nodes between the sender and the destination. In an idealized realization of the Internet, each node would have a globally significant unique IP address for use in specifying the node as a packet destination. However, under the currently prevalent version of the Internet Protocol (IP), version 4 (e.g., IPv4), there are in fact a limited number of such addresses. Therefore, many devices have private unregistered addresses that are only usable for routing within an isolated realm.

BRIEF DESCRIPTION OF THE SEVERAL VIEWS OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
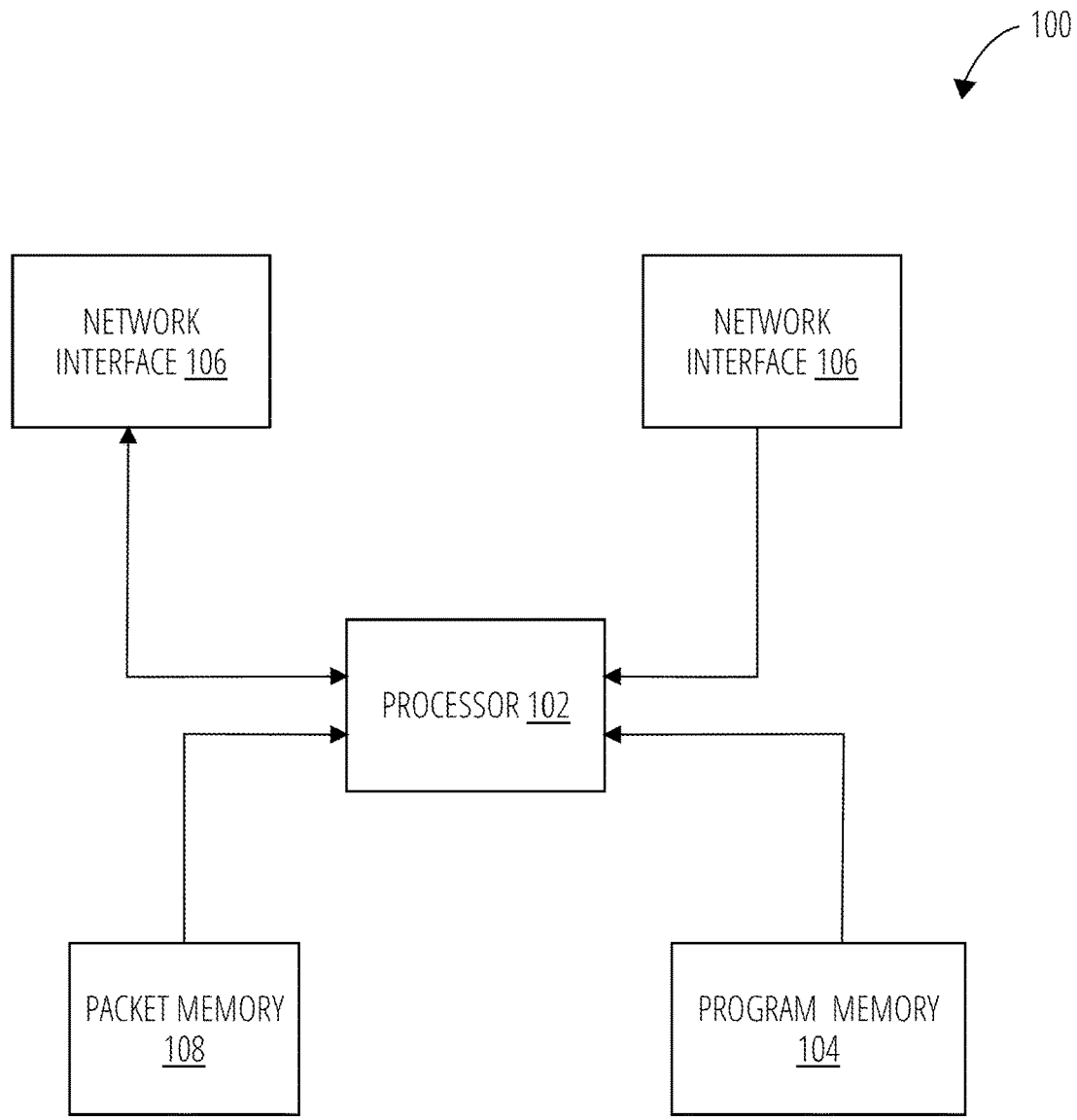
FIG. 1 illustrates a network device in accordance with one embodiment.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

The present disclosure is directed to techniques for inter realm routing between multiple IPv4 realms.

In one aspect, a method for forwarding packets between parallel IPv4 networks includes encapsulating an IP packet to include an outer header including a source node IP address and a destination realm IP address, and an inner header including a source realm IP address and a destination node IP address of the IP packet. The IP packet is routed to a shaft spanning a subset of addresses within the source realm and the corresponding addresses in the destination realm. Upon reaching the shaft in the source realm, a first swap of the inner header and the outer header of the IP packet is performed, where the outer header includes the source realm IP address and the destination realm IP address, and the inner header includes the source node IP address and the destination node IP address. The IP packet is forwarded inside the shaft from the source realm to the destination realm. Upon reaching the destination realm, a second swap of the inner header and the outer header of the IP packet is performed, where the outer header includes the source realm IP address and the destination node IP address, and the inner header includes the source node IP address and the destination realm IP address. The IP packet is forwarded in the destination realm to the destination node, where the globally significant IP address and the locally significant IP address are both configured for use in forwarding the IP packet without address translation.

In another aspect, the one or more of the source realm or the destination realm includes a realm address in IPv4 format.

In another aspect, a subset of IP addresses are reserved within the source realm as belonging to the shaft.

In another aspect, once the IP packet reaches the shaft, a node that serves the shaft in the source realm confirms that the source node IP address in the inner header is an address of the source realm. Based on confirming the source node address is within the source realm, the IP packet is forwarded to an address within the shaft of the source realm.

In another aspect, based on the second swap, security is not triggered for the IP packet based on the IP packet being routed in a direction that matches the source node IP address.

In another aspect, a globally significant IP address is resolved to identify a realm from a first component of a globally significant name, and a locally significant IP address is resolved to identify a destination node from a second component of a locally significant name.

In another aspect, transmitting the IP packet includes utilizing only a globally significant IP address in selecting a next hop node.

In another aspect, to reach Yet Another Double Address (YADA) nodes in alternate realms, YADA provides a stateful Network Address Translation (NAT) operation that performs an IPv4-to-YADA translation below the legacy stack.

In one aspect, a computing apparatus includes a processor and a memory storing instructions that, when executed by the processor, configure the computing apparatus to encapsulate an IP packet to include an outer header including a source node IP address and a destination realm IP address, and an inner header including a source realm IP address and a destination node IP address of the IP packet. The IP packet is routed to a shaft spanning a subset of addresses within the source realm and the corresponding addresses in the destination realm. Upon reaching the shaft in the source realm, a first swap of the inner header and the outer header of the IP packet is performed, where the outer header includes the source realm IP address and the destination realm IP address, and the inner header includes the source node IP address and the destination node IP address. The IP packet is forwarded inside the shaft from the source realm to the destination realm. Upon reaching the destination realm, a second swap of the inner header and the outer header of the IP packet is performed, where the outer header includes the source realm IP address and the destination node IP address, and the inner header includes the source node IP address and the destination realm IP address. The IP packet is forwarded in the destination realm to the destination node, where the globally significant IP address and the locally significant IP address are both configured for use in forwarding the IP packet without address translation.

In another aspect, the one or more of the source realm or the destination realm includes a realm address in IPv4 format.

In another aspect, a subset of IP addresses are reserved within the source realm as belonging to the shaft.

In another aspect, once the IP packet reaches the shaft, a node that serves the shaft in the source realm confirms that the source node IP address in the inner header is an address of the source realm. Based on confirming the source node address is within the source realm, the IP packet is forwarded to an address within the shaft of the source realm.

In another aspect, based on the second swap, security is not triggered for the IP packet based on the IP packet being routed in a direction that matches the source node IP address.

In another aspect, a globally significant IP address is resolved to identify a realm from a first component of a globally significant name, and a locally significant IP address is resolved to identify a destination node from a second component of a locally significant name.

In another aspect, transmitting the IP packet includes utilizing only a globally significant IP address in selecting a next hop node.

In one aspect, a non-transitory computer-readable storage medium, the computer-readable storage medium including instructions that when executed by a computer, cause the computer to encapsulate an IP packet to include an outer header including a source node IP address and a destination realm IP address, and an inner header including a source realm IP address and a destination node IP address of the IP packet. The IP packet is routed to a shaft spanning a subset of addresses within the source realm and the corresponding addresses in the destination realm. Upon reaching the shaft in the source realm, a first swap of the inner header and the outer header of the IP packet is performed, where the outer header includes the source realm IP address and the destination realm IP address, and the inner header includes the source node IP address and the destination node IP address. The IP packet is forwarded inside the shaft from the source realm to the destination realm. Upon reaching the destination realm, a second swap of the inner header and the outer header of the IP packet is performed, where the outer header includes the source realm IP address and the destination node IP address, and the inner header includes the source node IP address and the destination realm IP address. The IP packet is forwarded in the destination realm to the destination node, where the globally significant IP address and the locally significant IP address are both configured for use in forwarding the IP packet without address translation.

In another aspect, the one or more of the source realm or the destination realm includes a realm address in IPv4 format.

In another aspect, a subset of IP addresses are reserved within the source realm as belonging to the shaft.

In another aspect, once the IP packet reaches the shaft, a node that serves the shaft in the source realm confirms that the source node IP address in the inner header is an address of the source realm. Based on confirming the source node address is within the source realm, the IP packet is forwarded to an address within the shaft of the source realm.

In another aspect, based on the second swap, security is not triggered for the IP packet based on the IP packet being routed in a direction that matches the source node IP address.

In another aspect, a globally significant IP address is resolved to identify a realm from a first component of a globally significant name, and a locally significant IP address is resolved to identify a destination node from a second component of a locally significant name.

In another aspect, transmitting the IP packet includes utilizing only a globally significant IP address in selecting a next hop node.

DESCRIPTION OF EXAMPLE EMBODIMENTS

Methods and systems are disclosed that relate to data networking and more particularly to routing and addressing. While the transition to Internet Protocol (IP), version 6 (e.g., IPv6) started decades ago, large amounts of networks, hosts, and programs, are still IP, version 4 (e.g., IPv4) only. The IPv4 and IPv6 camps are quite entrenched, and it seems that a full transition to IPv6 may not happen—e.g., there may always be pockets of IPv4 network systems, or a combination of the two versions. The problem with IPv4 is that there are a limited number of IPV4 addresses—far less than what is needed to sustain the current internet, much less internet needs in the future. In an effort to conserve IPv4 addresses, many devices have private unregistered addresses that are only usable for routing within an isolated realm.

During the transition to IPv6, stacks must implement both protocols (aka dual stack) and/or a mechanism to use either IPv4 or IPv6. Service Providers must implement heavy weaponry called Carrier-Grade Network Address Translators (CG-NATs) to translate between protocols between legacy IPv4-only and IPv6-only stacks, and tunneling techniques such as DS-Lite [RFC7333] and 464XLAT [RFC6877] to traverse portions of the network that support only one of the IP versions. This means it is needed to have both CAPEX to install dual stack infrastructures and NAT devices and OPEX to maintain them. The current situation is often qualified as the worst of both worlds and any indications is that it's here to stay, till each side has suffered enough and is ready for a compromise.

Current techniques to handle IPv4 networks rely on Network Address Translation (NAT), which maps IP addresses between locally significant unregistered addresses and globally significant registered addresses. NAT operates on a gateway node between a realm that employs private unregistered addresses and an external realm that uses the globally unique registered addresses. The NAT gateway maps ports on the exterior-facing interface to globally significant addresses within the private realm. This arrangement operates in a relatively straightforward fashion for client-server sessions where clients within the private realm initiate sessions with servers in the global network. Both the address of the NAT gateway and the globally significant address of the server may be obtained by use of conventional domain name service (DNS) techniques.

It is much more difficult, however, for a client in the global network to contact a client or server located in the private address realm because of the need to somehow advertise the locally significant private address, or an equivalent usable in IP routing, outside the private address realm. One way to do this is a one-to-one mapping between interior private addresses and public globally significant addresses, but this defeats the objectives of employing NAT in the first place, such as the conservation of addresses. One can also map, e.g., a NAT gateway's HTTP port to a particular private address, the SMTP port to another private address, etc. This technique will not accommodate a large number of privately addressed nodes.

A new generation of Internet services requires peer-to-peer, client-to-client and client-to-server interactions that do not fit within the model accommodated by NAT. Consider, for example, Voice-over-IP (VoIP) where to call a voice-equipped node within the private address realm it is necessary to initiate a session with that node from outside the private realm. To solve this problem, one technique is to incorporate application level functionality within the NAT gateway so that the gateway can establish higher-level protocol sessions and forward packets based in part on application layer packet content. This greatly increases the amount of processing that must be done on packets passing through the gateway and also increases the amount of state information that the gateway must store.

What is needed is a compromise between the IPv4 and IPv6 networks. An acceptable compromise must provide both sides with a way to remain within IPv4 or IPv6 as long as desired, while eliminating the need for dual stack and CG-NATs between participating nodes. Certainly, an effort must be asked on each side to reduce the chasm, and that effort must come with enough benefits to effectively encourage a majority of interested parties to make the step.

Yet Another Double Address (YADA) refers to the IPv4 side to support a new IP-in-IP model. YADA extends packet forwarding capabilities with the support of an IP-in-IP format used to forward the packet between parallel IPv4 realms. The proposed benefit is a thousandfold increase of the IPv4-addressable domain by building parallel realms each potentially the size of the current Internet. Only the stacks that need to talk to a parallel realm need to evolve. Routing and forwarding can remain IPv4-only with the same operations as today, though new routers with YADA capabilities must be deployed to route between realms.

Yet Another Translation Technique (YATT) refers to an effort to be made by the IPv6 side to support a new IPv6 Prefix with special properties, which impacts source address selection (SAS). YATT extends [IPv6-addressing for the YATT format. The proposed benefit is a prefix (e.g., /32) per realm and a prefix (e.g., /64) per host in the realm. This address space may for instance become handy for load balancing between physical servers, virtual machines (VMs), and/or pods that operate a service associated with the virtual server that owns the host prefix.

In some embodiments, the YADA and YATT formats can be interchangeable, which means that the translation is stateless and can take place as a bump-in-the-stack at either end or can be operated at line rate anywhere in the network by an upgraded hardware. The routers that connect the shaft can also perform a stateless operation that can be achieved at line rate by upgraded hardware. This is how the chasm between IPv4 and IPv6 can be reduced, removing the need to deploy dual stack and CG-NATs between participating nodes.

The disclosed systems and methods provide a stepwise migration between IPv4 and IPv6 with steps from an IPv4-only stack/gateway/ISP to YADA to YATT to an IPv6-only version. The migration strategy allows portions of the nodes and of the networks to remain IPv4 (for example, by reducing the gap between the IPv4 and IPv6 only versions and the associated need for dual stack and CG-NATs. The systems and methods therefore allow for interoperating between realms employing private unregistered addresses and realms employing globally unique registered addresses while allowing nodes outside the private realm to initiate sessions with nodes inside the private realm.

FIG. 1 depicts a network device 100 that may be used to implement a network node operating in accordance with an example embodiment. In one embodiment, network device 100 is a programmable machine that may be implemented in hardware, software, or any combination thereof. A processor 102 executes code stored in a program memory 104. Program memory 104 is one example of a computer-readable storage medium. Program memory 104 can be a volatile memory such as a random access memory (RAM). Another form of computer-readable storage medium storing the same codes would be some type of non-volatile storage such as floppy disks, CD-ROMs, DVD-ROMs, hard disks, flash memory, etc. A carrier wave that carries the code across a network is another example of a computer-readable storage medium.

Network device 100 interfaces with physical media via a plurality (two are depicted) of network interfaces 106. For example, one of network interfaces 106 may couple to an optical fiber and may incorporate an appropriate physical and link layer functionality. Other examples of network interfaces include Ethernet interfaces, DSL interfaces, Gigabit Ethernet interfaces, 10-Gigabit Ethernet interfaces etc. Packets that are received, processed, and forwarded by network device 100 may be temporarily stored in a packet memory 108. Depending on its role, network device 100 implements various network protocols, extensions thereof, and data networking features provided by the present invention as will be explained below.

One embodiment of the present invention provides global reachability of IP addresses across the boundaries of IPv4 realms. Like the current public Internet, an IPv4 realm is defined by a full 4-byte address space. Locally significant addresses are defined to be those that are only significant and routable within the boundary of a given realm, and globally significant addresses are defined to be addresses that are reserved in all realms to identify realms or inter-realm routers. With this capability, clients can initiate sessions with clients or servers within other realms such as a privately addressed IPv4 network without the use of network address translation (NAT) or application gateways.

Figure 2:
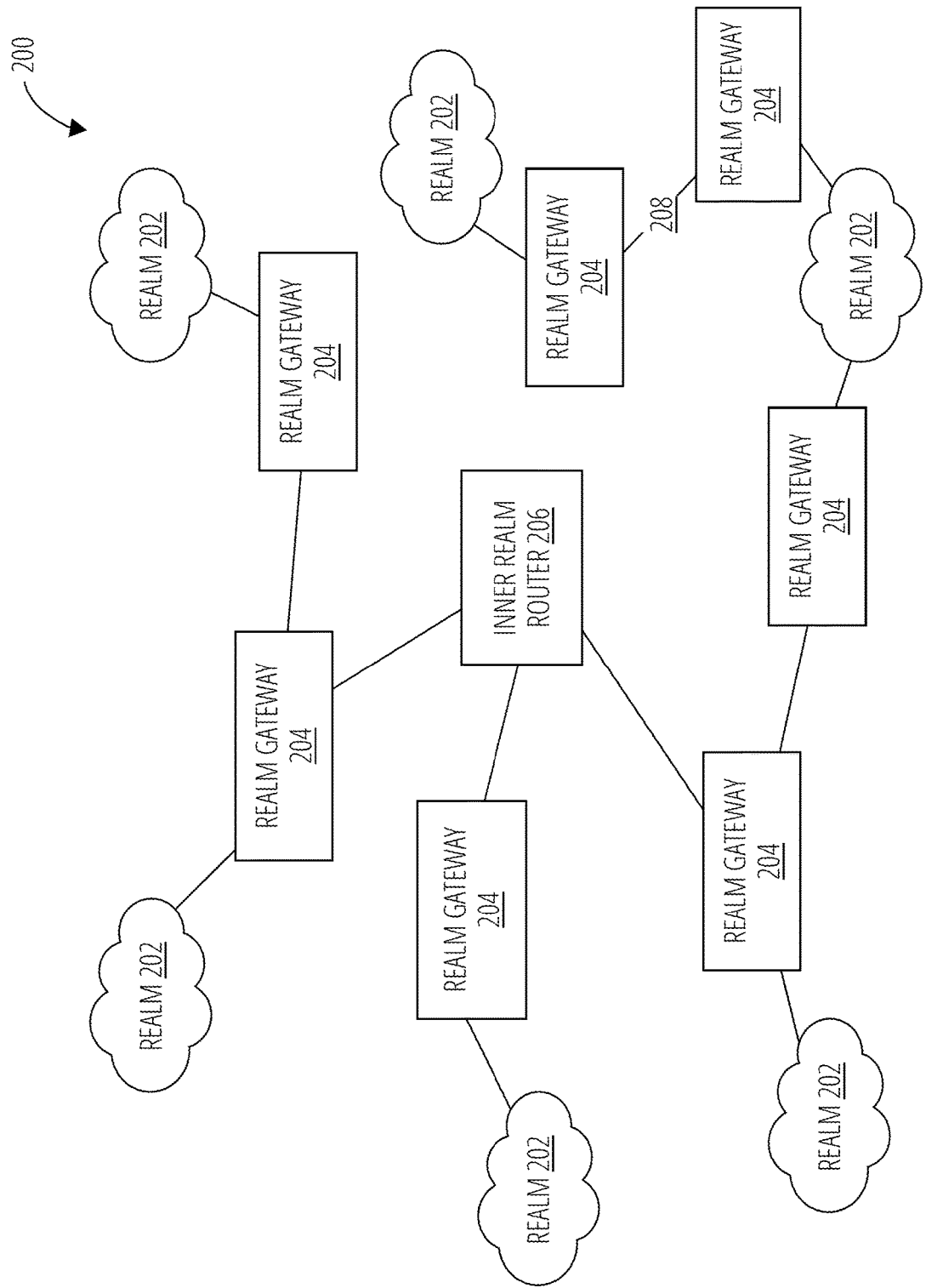
FIG. 2 illustrates an arrangement of realms and realm gateways in accordance with one embodiment.

FIG. 2 illustrates an arrangement of realms and realm gateways in accordance with an example embodiment. In accordance with some embodiments, an example architecture can include realms that are connected to the globally addressed network by realm gateways. FIG. 2 depicts such an architecture. Each of realms 202 incorporates a cloud of network nodes having an IPv4 address unique within that realm but are not globally unique. External access to each realm 202 is through one or more realm gateways 204. Realm gateways 204 are interconnected either point-to-point or through peer lines 206 or via inter-realm routers such as depicted inter-realm router 208.

In embodiments, each realm has a globally significant IPv4 address. Routers such as inter-realm router 208 that interconnect realm gateways 204 may also be attributed globally significant addresses. The globally significant IPv4 address is preferably in a predefined range globally allocated for realm addresses. This range is reserved in all realms and cannot be used for locally significant addresses. Each node within one of realms 202 has a globally unique IP address that consists of a concatenation of its realm's globally significant IPv4 address and its own locally unique IPv4 address.

Figure 3:
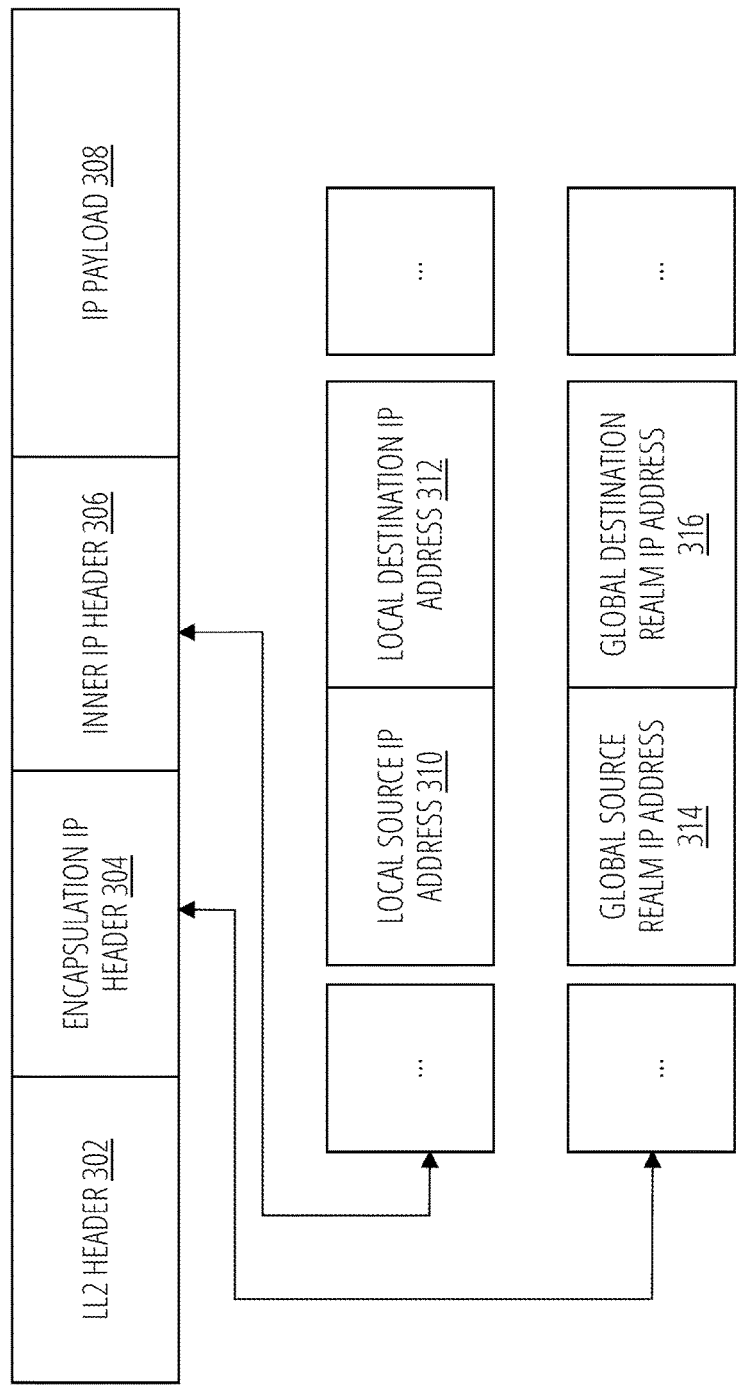
FIG. 3 illustrates a packet structure employing both a globally significant IP address and a locally significant IP address in accordance with one embodiment.

FIG. 3 depicts a packet structure according to an example embodiment. A packet 300 includes an LL2 header 302 that includes link layer protocol information, an Encapsulation IP Header 304, an Inner IP Header 306, and an IP Payload 308.

In embodiments, details of Encapsulation IP Header 304 include a global source realm IP Address 314 identifying the realm that sources the packet and a global destination realm IP Address 316 identifying the realm of the packet's destination. Further contents of Encapsulation IP Header 304 may be specified by the GRE protocol as known in the art. Inner IP Header 306 includes a Local Source IP Address 310 giving the local IPv4 address of the packet source and Local Destination IP Address 312 giving the local address of the packet destination. For both the destination and the source, the combination of local and realm addresses represents a "fully qualified" address.

In some embodiments, only one of the two destination address fields is used for forwarding at a time depending on the location of packet 300. Prior to reaching the destination realm, the global destination realm IP Address 316 is used for forwarding decisions. Realm gateways 204 advertise, using BGP-4, for example, the globally significant addresses of the realms to which they are attached and the other realms that may be reached through them. The use of the global destination realm IP Address 316 thus has the beneficial effect of aggregating traffic destined for the identified realm. Once the destination realm is reached, the local destination IP address field 312 is used for routing instead.

As a special case within this scheme, the current or "legacy" IPv4 address space can also be represented in two-part form. A specific global realm address is allocated to specify legacy IPv4 global addresses. The composite address of a node that has been previously allocated a globally significant address would include this specified global realm address and the legacy IPv4 address as the local address.

It will be appreciated that the concept that has been described is readily extendible to three or more levels of address hierarchy. For example, a packet may include a first header with global IP addresses, a second header with realm IP addresses significant only within a given realm, and a third header with sub-realm IP addresses significant only within a sub-realm.

Returning now to the discussion of the two-level address hierarchy illustrated in FIGS. 2-3, implementation preferably involves modifications at both gateways 204 and at nodes within realms 202. These modifications include modifications to the operation of applications operating at the client nodes, modifications to packet handling at the application gateway, and modifications to the processes of resolving names to IP addresses. Modifications within the inter-realm gateways are not necessary. These can continue to operate in accordance with standard IPv4 techniques.

In one embodiment, an extension to the well-known DNS protocol is used to provide host names that may be resolved to the two-part addresses described above. This may be accomplished through a syntactical change to the DNS naming convention. For example, each realm may bear a worldwide, cross-realm, unique name in the form REALM-NAME. Each node within such a realm may have a name in the form LOCAL-DNS@REALMNAME. A client outside the realm seeking to resolve a name in the form LOCALDNS@REALMNAME will first send a request to its global DNS server requesting a record for REALM-NAME. What will be returned will be a globally significant IP address for REALMNAME plus an address for a DNS server. The DNS server address will typically be a locally significant IPv4 address for the DNS server within the target realm. Using both addresses, the client contacts this latter DNS server to resolve LOCAL-DNS to a locally significant address. With the locally significant address and the globally significant realm address, the client has the information to populate the destination fields of packet 300.

The present invention is not, however, limited to DNS resolution techniques. For example, for voice over IP (VoIP) applications, SIP may be used to resolve a single phone number to a combination of globally significant realm address and locally significant node address. In this case, an SIP server would be contacted to obtain address information.

Figure 4:
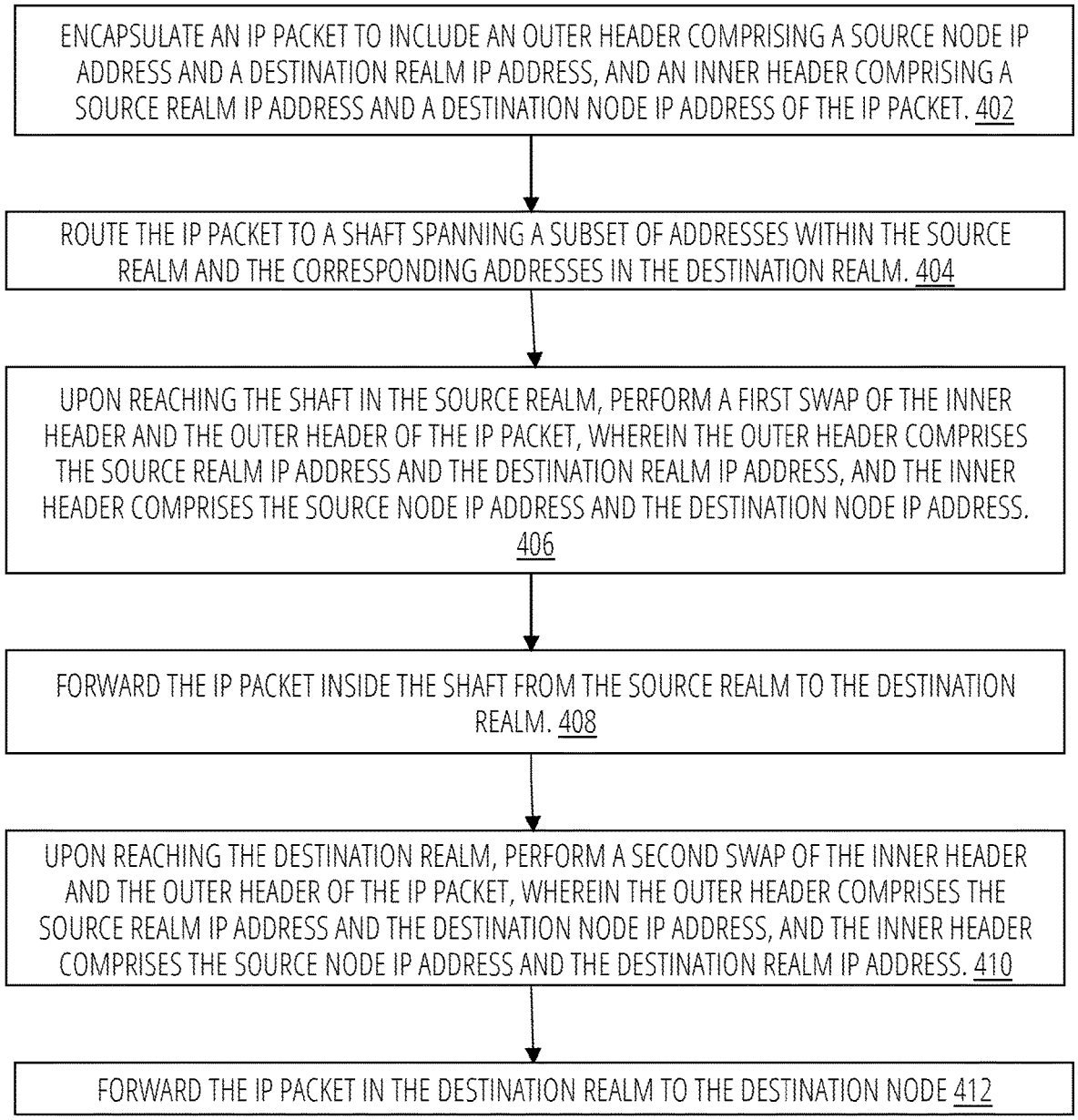
FIG. 4 is a flowchart describing steps of routing packets within legacy IPv4 systems and current IPv6 systems in accordance with one embodiment.

FIG. 4 is a flowchart describing the steps of routing packets within legacy IPv4 systems and current IPv6 systems in accordance with one embodiment. The following example embodiment provides a stepwise migration between IPv4 and IPv6 networks that allows a network from an IPv4-only stack/gateway/ISP to communicate with networks from Yet Another Double Address (YADA) to Yet Another Translation Technique (YATT) to an IPv6-only version. The migration strategy allows portions of the nodes and of the networks to remain IPv4.

In embodiments, an IPv4 realm can refer to a full IPv4 network like the current Internet. In some embodiments, YADA does not affect the traditional IPv4 operations within a realm. The shaft:=can refer to a collection of IPv4 unicast and multicast prefixes that are assigned to Inter-realm communications and, in some instances, cannot be assigned to hosts or multicast groups within a realm. A Realm address can refer to an IPv4 address that derives from a shaft prefix. A uni-realm address can refer to a realm address that is unicast or anycast. A realm can have more than one Uni-realm address. A multi-realm address can refer to a realm address that is multicast and denotes a collection of realms. A YADA realm prefix can refer to a prefix assigned to the shaft and from which realm addresses can be derived. A YADA NAT prefix can refer to a prefix assigned to the YADA bump-in-the-stack NAT operation. A Double-A or YADA address can refer to a YADA address is a tuple (realm address, IPv4 address) where the IPv4 address is only significant within the realm denoted by the realm address. A YATT Space can refer to an IPv6 range that is assigned for YATT operation. A YATT prefix can refer to an IPv6 prefix that is derived from a YADA address by appending the YATT space prefix, the (truncated) realm address and the IPv4 address. A YATT-IID can refer to a 64-bit assigned constant that is used in YATT to statelessly form an IPv6 address from a YATT prefix. Multinternet can refer to a collection of IPv4 realms interconnected using a common shaft.

In some embodiments, in YATT the IPv6 stack owns a prefix that derives from a YADA address associated to a realm, even if there's absolutely no IPv4 operation taking place in that realm. The resulting connectivity without dual stack and CG-NAT is as follows:

A legacy IPv4-only node can only talk within its realm. It can talk to an IPv4 legacy node, a YADA IPv4-only node, and even a YATT IPv6-only node, e.g., leveraging a bump-in-the-stack in the YATT node if the access network is IPv4-only.¶

In addition, a YADA IPv4-only node can talk across realms to a YADA IPv4-only node and to any YATT IPv6-only node, e.g., leveraging a bump-in-the-stack in the YADA node if the network is IPv6-only.

In addition, a YATT IPv6-only node can talk to any other IPv6-only node.

Connectivity between an IPv4-only node and an IPv6-only node, or between an IPv4-only node and a YADA node in different realm, still requires a CG-NATs, e.g., using the YATT format for the IPv6 side in an unmodified CG-NAT.

At block 402, an IP packet is encapsulated to include an outer header including a source node IP address and a destination realm IP address, and an inner header including a source realm IP address and a destination node IP address of the IP packet. The encapsulation process in YADA allows the internet to grow beyond the current IPv4 realm that limits its capacity to form public addresses. Depending on the assignments to be made, the model allows the reuse of all IP addresses and all Autonomous System Number (ASN) currently available in the IPv4 internet hundreds to millions of times. This is achieved by interconnecting IPv4 realms via a common footprint called the shaft.

The shaft works the following way: in the analogy of a building, the ground floor would be the Internet, and each additional floor would be another IPv4 realm. The same surface of the floor is available in each level, analog to the full IPv4 addressing that is available in each realm. The same footprint is dedicated across the building levels for the elevator shaft. The elevator shaft enables a third dimension that spans across the levels and allows traffic to traverse from any level to any other level. The elevator shaft itself, however, cannot be used for destination node addressing.

By analogy, YADA assigns IPv4 prefixes to a multinternet shaft; those prefixes are common across the realms that are interconnected by the shaft. A single /24 IPv4 prefix assigned allows for >250 times the capacity of the IPv4 Internet. Multiple prefixes can be assigned to the shaft for unicast and multicast communications, and each realm needs at least one unicast address in the shaft called its realm address. A YADA address is formed by the tuple (realm address, IPv4 address) and is advertised in DNS as a new double-A record.

YADA leverages IP-in-IP encapsulation to tunnel packets across the shaft while normal IPv4 operations happen within a realm. YADA requires a change in the stack in the YADA endpoints that communicate with other realms to support the IP-in-IP YADA encapsulation. YADA also provides a bump in the stack method for legacy applications.

Once an IP packet is encapsulated with the inner and outer headers, the IP packet is routed to the shaft in block 404. In embodiments, the shaft can span a subset of addresses within the source realm and a subset of addresses in the destination realm. Any addresses within the elevator shaft itself, however, cannot be used as a destination node address.

Upon reaching the shaft in the source realm, the inner header and the outer header of the IP packet are swapped in block 406. For example, the outer header includes the source realm IP address and the destination realm IP address, and the inner header includes the source node IP address and the destination node IP address. The IP packet is then forwarded inside the shaft from the source realm to the destination realm at block 408.

Upon reaching the destination realm, the inner header and the outer header of the IP packet are swapped a second time at block 410. For example, the outer header includes the source realm IP address and the destination node IP address, and the inner header includes the source node IP address and the destination realm IP address.

The IP packet is then forwarded in the destination realm to the destination node at block 412. In some embodiments, the globally significant IP address and the locally significant IP address are both configured for use in forwarding the IP packet without address translation.

Additionally and/or alternatively, in some embodiments a mechanism called Yet Another Translation Technique (YATT) translates the YADA packet format into flat IPv6 packet format. While a YADA address pair can be seen as some foot print in one level, the YATT prefix encompasses that same foot print plus all the air above it. For unicast addresses, YATT forms an IPv6 prefix by collating an well-known assigned short prefix, the realm address (in the shaft), and the host IPv4 address (locally significant within the realm). The resulting IPv6 prefix is automatically owned by the host that owns the IPv4 address in the realm. YATT then forms an IPv6 address for that host by collating a well-known Interface ID, so there's a one-to-one relationship between the YADA and the IPv6 address derived from it.

The YADA (the IPv4 formulation) and YATT (the IPv6 formulation) can be alternative representations of the same abstract object (a double address), which can serve as an intermediate step across the IPv4-IPv6 chasm. The IPv4 formulation (YADA) is a plain IP-in-IP with no new extension. The IPv6 formulation (YATT) uses a standard IPv6 header with a special encoding of the addresses. Furthermore, the formulations can be interchangeable; if a link supports both IP versions then the next hop is valid for both formulations, whichever of the 2 Address Families (AFs) was used to learn it; else any node can convert one formulation to the other to accommodate the IP version that is available on the next hop link.

Figure 5A:
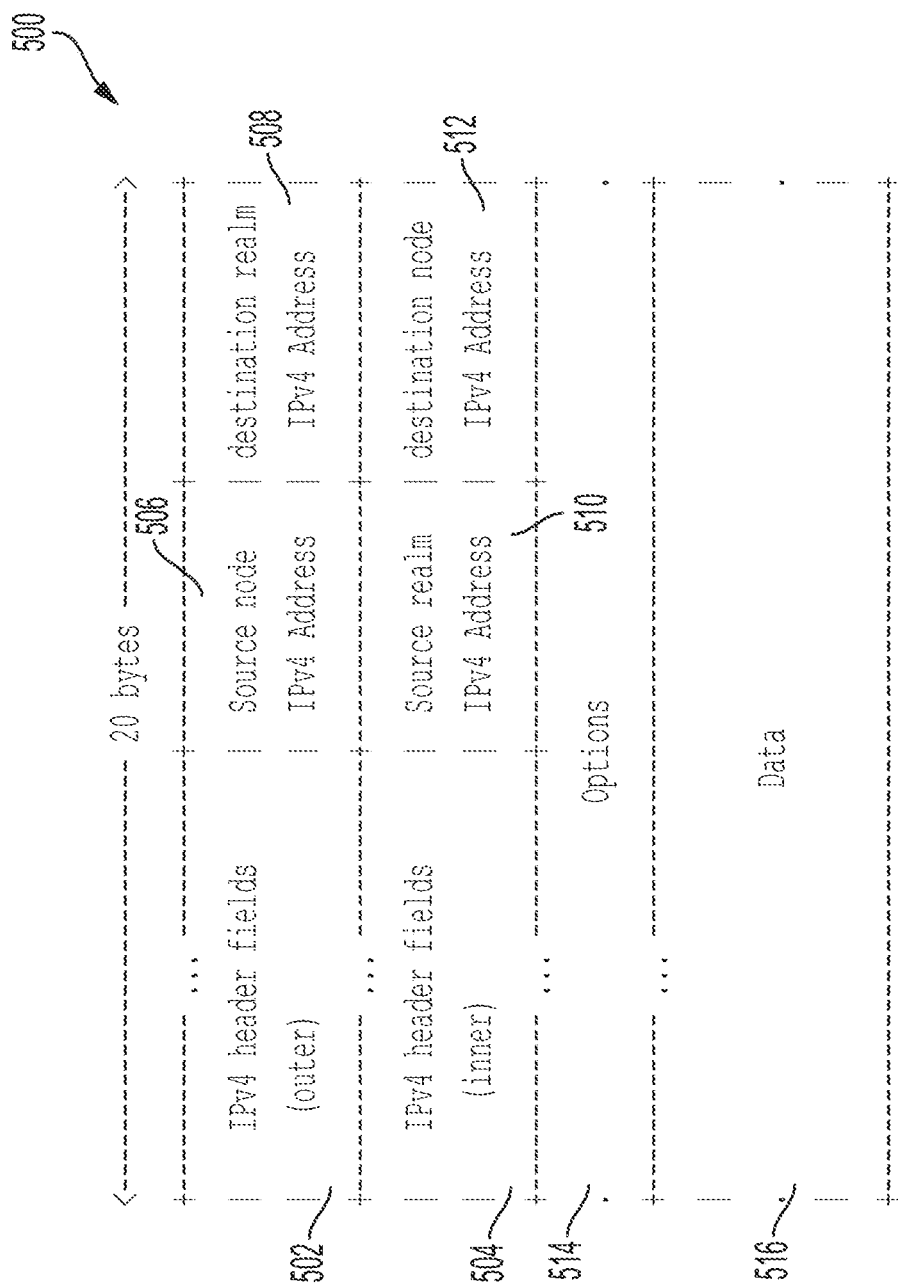
FIG. 5A illustrates an IP packet structure in the source realm employing both a globally significant IP address and a locally significant IP address in accordance with one embodiment.

FIG. 5A illustrates an IP packet structure in the source realm employing both a globally significant IP address and a locally significant IP address in accordance with one embodiment. In embodiments, YADA leverages IP-in-IP encapsulation to tunnel packets across a shaft for inter-realm communications, while the IPv4 operations within a realm are unaffected. The YADA address can be found by using both the inner and the outer headers of an IP packet and combining that information.

For example, IP packet 500 depicts a packet structure in the source realm. The IP packet 500 includes both outer IP header fields 502 and inner IP header fields 504. In the source realm (e.g., ingress realm), the IP packet 500 can include in the outer IP header fields 502 the source node (IPv4) address 506 and the destination realm (IPv4) address 508. The inner IP header fields 504 can include the source realm (IPv4) address 510 and the destination node (IPv4) address 512. The rest of the IP packet 500 can include one or more of options 514 and data 516.

In some embodiments, the pair of IP headers (inner 504 and outer 502) can be seen by a YADA stack as a single larger header, though a non-YADA forwarder only needs the outer header and plain IPv4 operations on the outer IPv4 header to forward.

For inner 504 and outer 502 header encapsulation, YADA can require a change in the stack in the YADA endpoints that communicate with other realms to support the YADA encapsulation. A stack that resolves a DNS name with a double-A record indicating a different realm generates an IP-in-IP packet to signal both the source and destination realms and the source and destination IPv4 addresses within the respective realms.

Figure 5B:
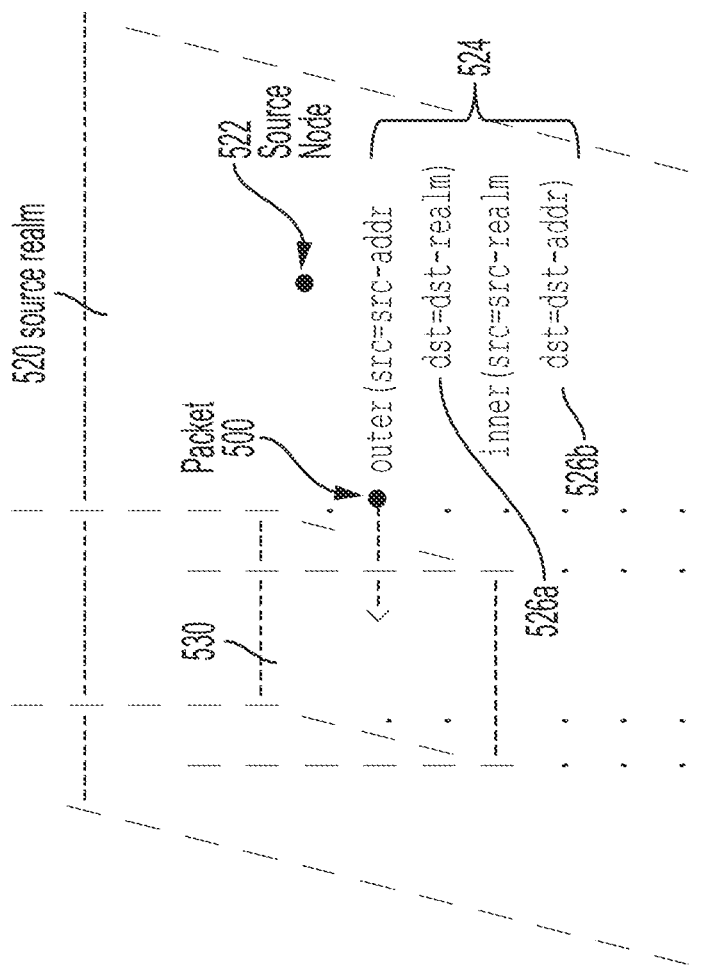
FIG. 5B illustrates IP packet traffic within the source realm in accordance with one embodiment.

FIG. 5B illustrates IP packet traffic within the source realm in accordance with the IP packet 500 structure shown in FIG. 5A. Source realm 520 includes a source node 522 with source node address 506. The IP packets from source node 522 will have a packet structure 524 like that of IP packet 500, with both outer header 526a and inner header 526b. The IP packet will be forwarded based on the outer header 526a, where the source is specified as source node address 506 and the destination is destination realm address 508. This destination location causes the IP packet to be forwarded to the shaft 530.

Figure 6A:
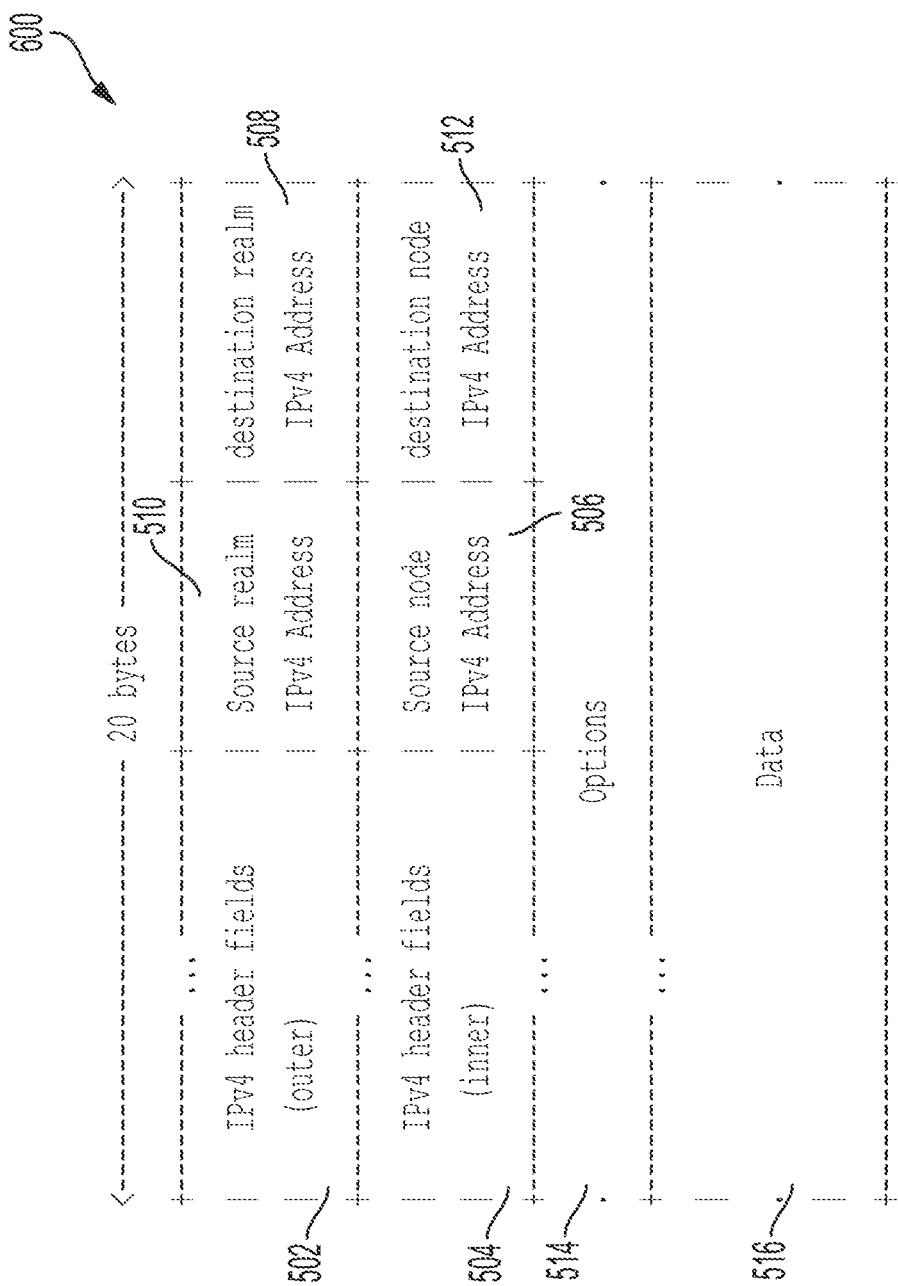
FIG. 6A illustrates an IP packet structure inside the shaft employing both a globally significant IP address and a locally significant IP address in accordance with one embodiment.

FIG. 6A illustrates an IP packet structure inside the shaft (e.g., the shaft 530) employing both a globally significant IP address and a locally significant IP address in accordance with one embodiment. The shaft can transport IP packets between different IPv4 realms: e.g., forward packet traffic from a source realm to a destination realm, where one or more of the source realm or the destination realm includes realm addresses in IPv4 format. A subset of IPv4 addresses are reserved within each realm, such as the source realm and/or the destination realm, as belonging to the shaft.

For example, YADA can assign IPv4 prefixes to a multi internet shaft. In some embodiments, those prefixes must be the same across all the realms that are interconnected by the shaft. Multiple prefixes can be assigned to the shaft for unicast and multicast communications, and each realm needs at least one unicast address in the shaft called its realm address. A YADA address can be formed by the tuple (realm address, IPv4 address) and can be advertised in DNS as a new double-A record. Because the YADA prefixes are assigned for YADA, a packet that has either source or destination IPV4 address derived from a shaft prefix is a YADA packet.

In other words, the structure of the shaft can be implemented in one IXP, spans all realms, and each realm has one address in the shaft with one router serving that realm. The address of the realm can be encoded in a loopback in the router, and advertised through an IGP inside the shaft, while BGP is used inside the realms but not inside the shaft. The shaft can have a single large prefix that is advertised in each realm by the router that serves the shaft, and that is disaggregated into host routes inside the shaft.

When the packet reaches the shaft, the router that serves the shaft in this realm checks that the packet source in the inner header is an address of this realm, and if so, it swaps the inner and outer source IPv4 address, and forwards the packet down the shaft. This way, the packet remains topologically correct inside the shaft, as shown in IP packet 600. IP packet 600 includes, after the swap, the source realm (IPv4) address 510 and the destination realm (IPv4) address 508 in the outer header fields 502; and the source node (IPv4) address 506 and the destination node (IPv4) address 512 in the inner header fields 504. The rest of IP packet 600 can include one or more of options 514 and data 516.

Figure 6B:
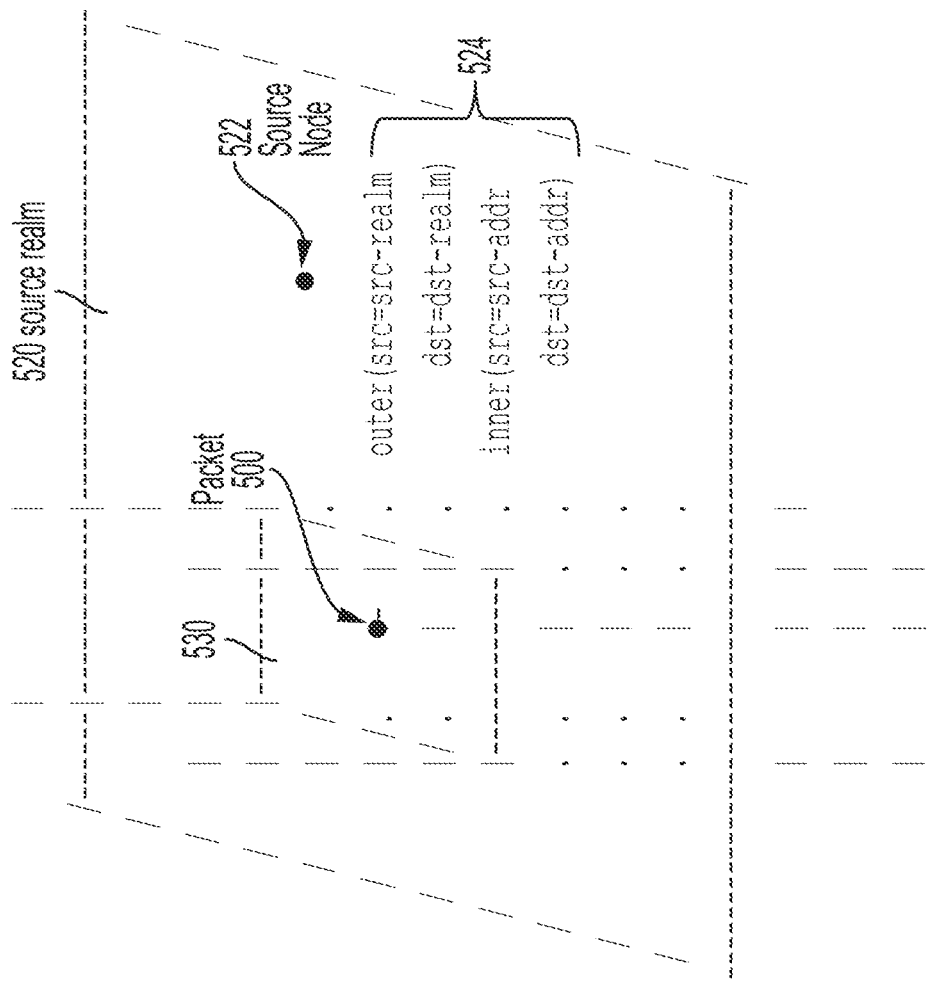
FIG. 6B illustrates IP packet traffic within the shaft in accordance with one embodiment.

FIG. 6B illustrates IP packet traffic within the shaft in accordance with one embodiment. Once packet 500 reaches the shaft 530, a node (such as the switch or router that serves the shaft 530 in the source realm 520), confirms that the source node IP address 506 in the inner header 504 is an address of the source realm 520 and then swaps the sources at shaft 530 ingress. For example, the packet structure 524 includes an inner header 504 encapsulated by an outer header 502, such that when packet 500 reaches shaft 530, the node within the shaft 530 checks that the source node address 506 within the outer header 502 is within the source realm 520 and, if so, swaps the source node address 506 with the source realm address 510. Therefore within the shaft, packet 500 structure 542 includes the source realm address 510 and the destination realm address 508 in the outer header 502, and the source node address 506 and the destination node address 512 in the inner header 504. The shaft 530 then forwards packet 500 to destination realm address 508, an address within the shaft 530 of the destination realm. For example, in some embodiments, based on a longest match, the router forwards the packet inside the shaft 530 following the host route to a router that serves the destination realm.

Figure 7A:
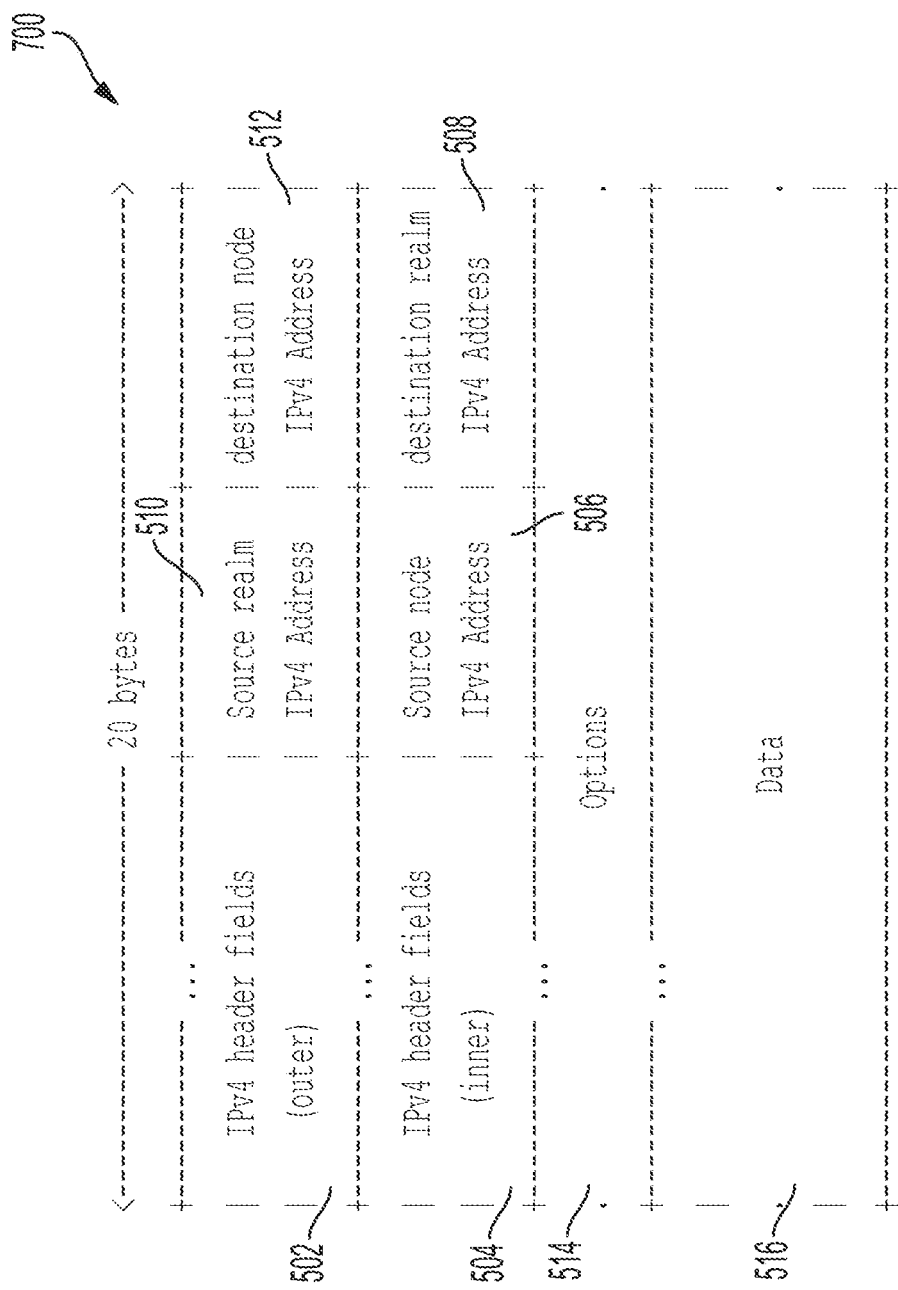
FIG. 7A illustrates an IP packet structure in the destination realm employing both a globally significant IP address and a locally significant IP address in accordance with one embodiment.

FIG. 7A illustrates an IP packet structure in the destination realm employing both a globally significant IP address and a locally significant IP address in accordance with one embodiment. When the packet reaches the destination realm, the router that serves the shaft in the destination realm swaps the destination addresses at shaft egress. Packet 500 is then forwarded to the destination node by the shaft 530. This way, based on the swap at shaft 530 egress, security is not triggered for packet 500 based on packet 500 being routed in a direction that matches the source realm address 510 (which is where it looks like packet 500 is travelling from). Therefore, IP packet 700 includes, after the second swap, the source realm (IPv4) address 510 and the destination node (IPv4) address 512 in the outer header fields 502; and the source node (IPv4) address 506 and the destination realm (IPv4) address 508 in the inner header fields 504. The rest of IP packet 700 can include one or more of options 514 and data 516.

Figure 7B:
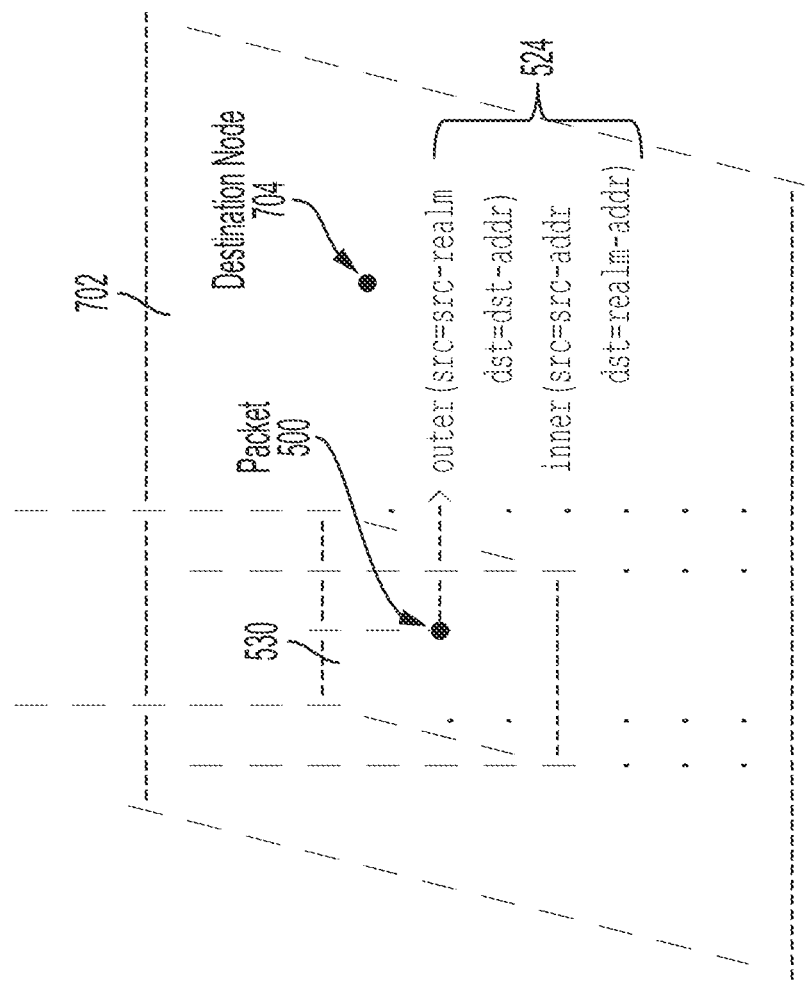
FIG. 7B illustrates IP packet traffic within the destination realm in accordance with one embodiment.

FIG. 7B illustrates IP packet traffic within the destination realm in accordance with one embodiment. Once packet 500 reaches the destination realm 702, a node (such as the switch or router that serves the shaft 530 in the destination realm 702), confirms that the destination realm address 508 is an address of the destination realm 702, and then the shaft 530 swaps the destination addresses at shaft 530 egress. Therefore at shaft 530 egress, packet 500 structure 542 includes the source realm address 510 and the destination node address 512 in the outer header 502, and the source node address 506 and the destination realm address 508 in the inner header 504. The shaft 530 then forwards packet 500 to destination node address 512 within destination realm 702.

In case of an error down the shaft or in the destination realm, in some embodiments, if an Internet Control Message Protocol (ICMP) message is generated by a node that is not YADA-aware, the message reaches the router that serves the shaft in the source realm. If the inner header is present in the ICMP payload, then the Router extracts it and forwards it to the packet source. If the destination stack does not support YADA and decapsulates, the message reaches the router that serves the destination realm which logs and drops. Based on the log, the node may be updated, or the DNS records may be fixed to avoid pointing on a node that does not support YADA.

Figure 8:
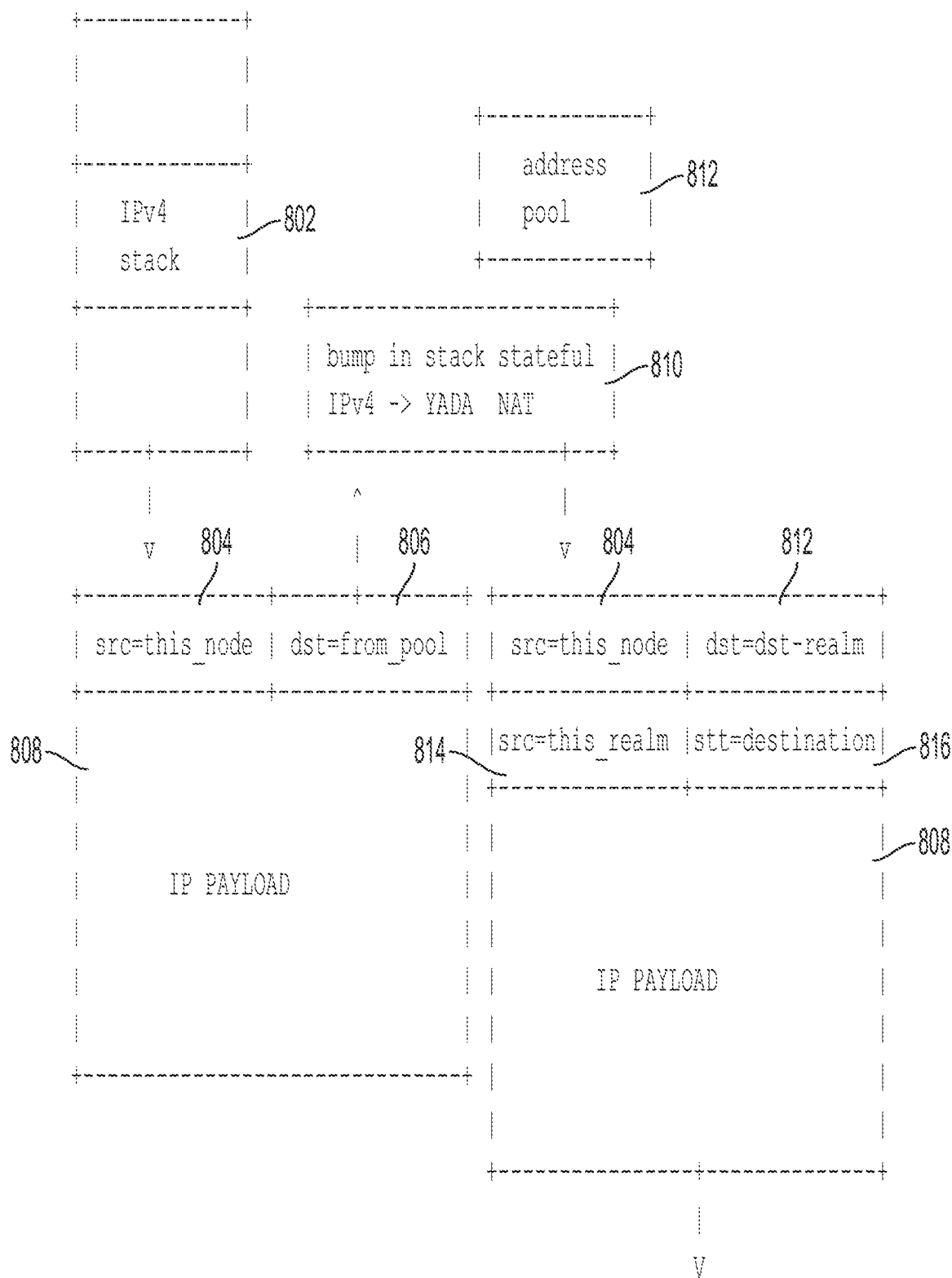
FIG. 8 illustrates a YADA Stateful NAT operation in accordance with one embodiment.

FIG. 8 illustrates a YADA Stateful NAT operation in accordance with one embodiment. In some embodiments, inside a realm, a YADA stack falls back to classical IPv4 operations and will natively connect to any legacy IPv4 peers. To reach YADA nodes in alternate realms, YADA also provides a stateful NAT operation that performs an IPv4-to-YADA translation below the legacy stack. The translation can reuse some prefix space allocated for either [RFC1918] or [RFC6598] for a local NAT pool that is used to present a single address to the legacy stack.

The YADA formulation couples a realm address with a public IPv4 address. Taking a packet in the IPv4 stack 802 with source address 804 and destination address 806 and IP payload 808, a host that owns a public address may perform the YADA stateful NAT operation as a bump-in-the-stack 810 below the legacy stack. In a private network, the operation is preferably done in the private gateway, outside the existing private-public NAT so it operates on the resulting public address, to keep the classical NAT operation as is.

The stateful NAT intercepts the DNS lookups. If the response contains an A record, then the address is reachable in the local realm and the NAT ignores that destination, letting the legacy operations take place transparently.

When the response yields a double-A record with a foreign realm (Double-A or YADA address can be a YADA address that is a tuple [realm address, IPv4 address] where the IPv4 address is only significant within the realm denoted by the realm address), the stateful NAT allocates an IPv4 address from the local NAT pool 812 and adds it in an A record to the DNS response. A local NAT state is built, indexed by the double-A outside and the allocated single-A inside.

When the legacy stack pushes a packet to that particular address, the stateful NAT translates to the YADA format, using the information in the double-A record for the destination address 816 and destination realm 812, and the local realm as source realm 814.

The other way around, if a packet arrives in the YADA formulation from a different realm, the stateful NAT allocates an address from the pool, and NATs to classical IPv4 using that address as source.

As an optimization, a NAT in a private gateway may learn which nodes inside support YADA and bypass the YADA stateful NAT operation completely for those nodes.

As long at the bump-in-the-stack (or the gateway) generates YADA packets, the packets can be translated statelessly to YATT as a last bump-in-the-stack operation before transmission to be pushed on an IPv6-only link.

The YATT and YADA formulations refer to the same object. A node that is configured with a YATT address is de facto owner of the embedded IPv4 address within the embedded IPv4 realm, and that address can be used to install a legacy IPv4 stack even if the attachment link is pure IPv6. As long at the stack generates YADA packets, the packets can be translated statelessly to YATT as a next bump-in-the-stack operation before transmission and placed on the IPv6-only network.

Figure 9A:
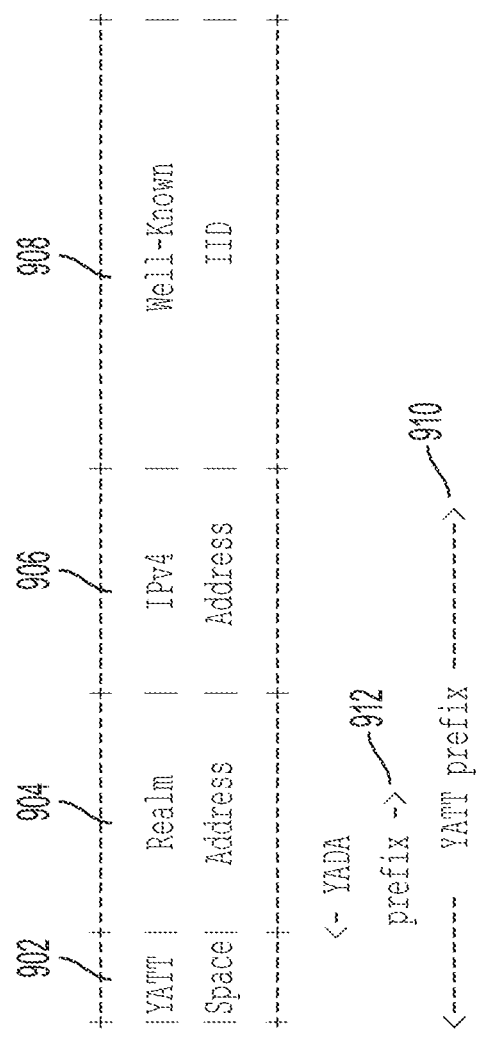
FIG. 9A illustrates a YATT technique that translates the YADA format into flat IPv6 in accordance with one embodiment.

FIG. 9A illustrates a YATT technique that translates the YADA format into flat IPv6 in accordance with one embodiment. For unicast addresses, in some embodiments, a Yet Another Translation Technique (YATT) can form an IPv6 prefix by collating an well-known assigned short prefix called the YATT space, the realm address, and/or the host IPv4 address (locally significant within the realm). The resulting IPv6 prefix can be automatically owned by the host that owns the IPv4 address in the realm. Therefore, the YATT space 902 within a packet structure can include realm address 904, an IPv4 address 906, and a well-known interface ID (IID) 908. The YATT Space 902 can be an IPv6 range that is assigned for YATT operation. In some embodiments, YATT prefix 910 can be an IPv6 prefix that is derived from a YADA address by appending the YATT space prefix 902, the (truncated) realm address 904 and the IPv4 address

906. The YATT-IID 908 can be a 64-bit assigned constant that is used in YATT to statelessly form an IPv6 address from a YATT prefix.

Depending on assignment, the leftmost piece realm prefix may be truncated in some embodiments to allow the YATT space 902 and the realm address 904 to fit in a 32-bit DWORD. This way, the YATT prefix can be a full /64 prefix that is entirely owned by the host that owns the associated YADA address (e.g., YADA prefix 912).

YATT then forms an IPv6 address for that host by collating a well-known Interface ID 908, so there's a one-to-one relationship.

Figure 9B:
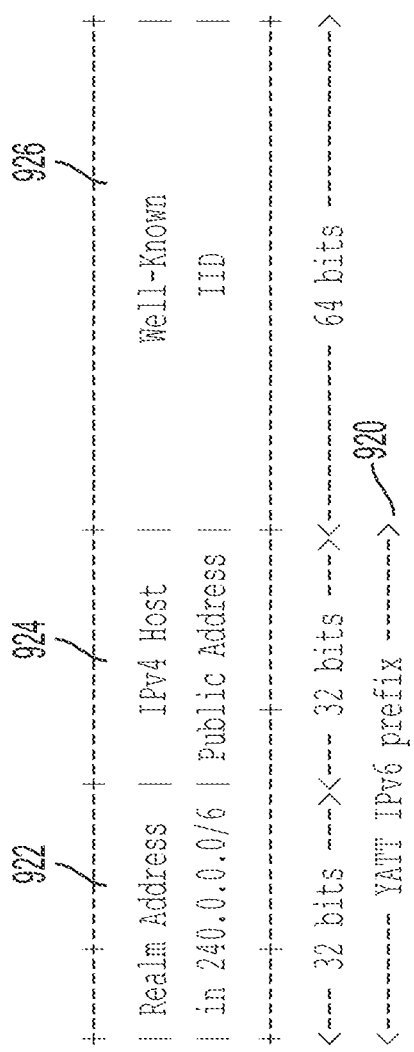
FIG. 9B depicts a YATT format using 240.0.0.0/6 in accordance with one embodiment.

FIG. 9B depicts a YATT format using 240.0.0.0/6 in accordance with some embodiments. If the YATT Space is F000::/6 and the YADA prefix is 240.0.0.0/6, the values perfectly overlap and the YATT format becomes as follows: a YATT IPv6 prefix 920 that includes a realm address 922 in 240.0.0.0/6 in 32 bits and an IPv4 host public address 924 in 32 bits, and then the well-known IID 926 in 64 bits.

In this format, the NAT operation can be a plain insertion. Depending on the assignment, it might be that the realm address 922 must be placed in full after the YATT space. In that case, the length of the YATT prefix will be more than 64 bits.

Also, since 240.0.0.0/6 is currently unassigned, using it for the shaft would allow the reuse of every Autonomous System Numbers (ASNs) and every IPv4 address currently available in the Internet in each and every other realm and reallocate them in any fashion desirable in that realm.

If the network supports IPv6 in the shaft, it makes sense for the YADA host or the bump-in-the-stack to generate the packets in the YATT form natively. The shaft router must then attract the shaft YADA realm prefix in both IPv4 and YATT forms.

If the network is IPv4 only, the packets are still generated using IP-in-IP, and the YATT NAT operation may happen at the router that delivers the packet in the destination realm, if it is v6-only, or in the destination host, if its stack is v6-only.

Figure 9C:
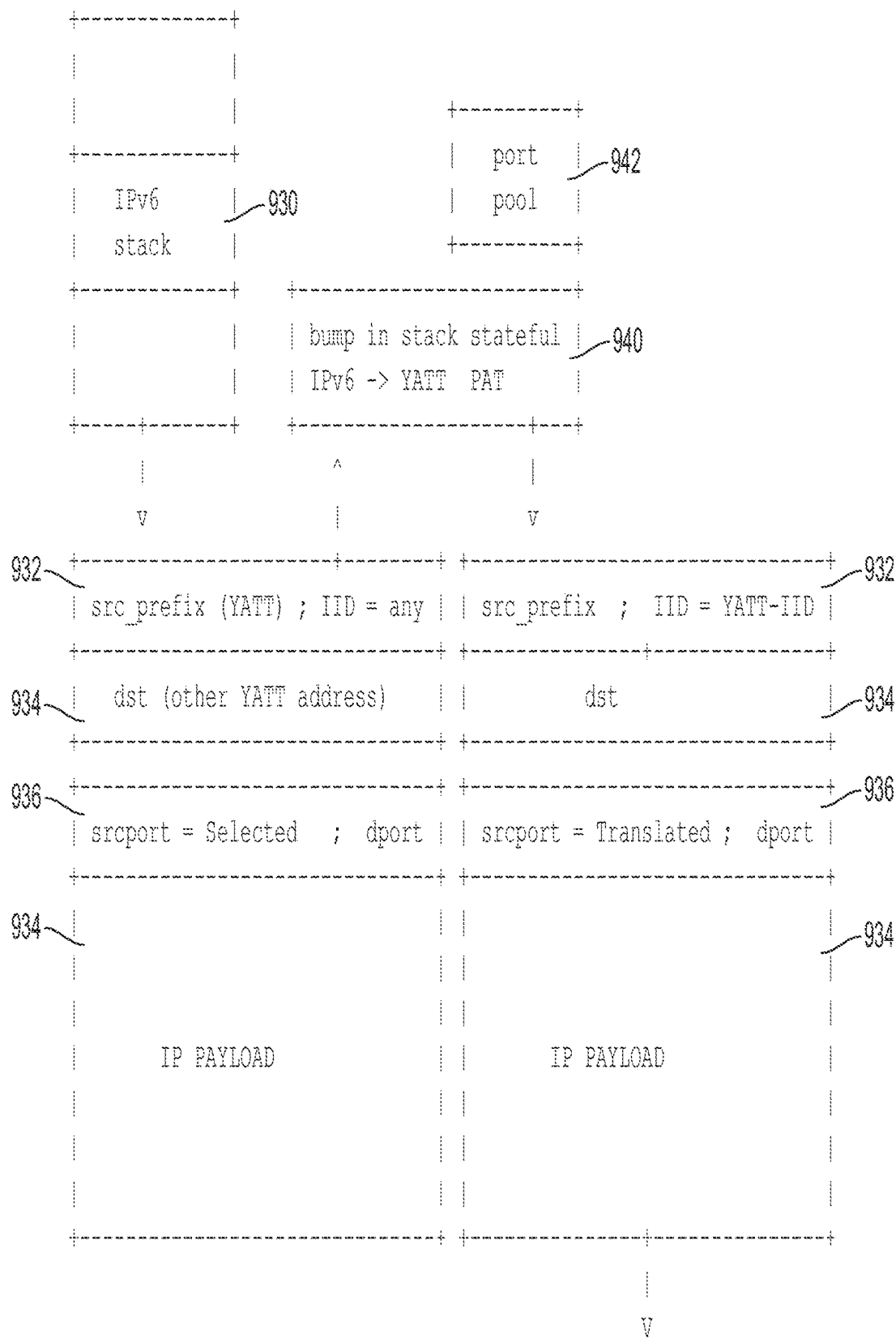
FIG. 9C illustrates a YATT node that leverages a stateful Port Address Translation technique in accordance with one embodiment.

FIG. 9C illustrates a YATT node that leverages a stateful Port Address Translation technique in accordance with one embodiment. The YATT and YADA formulations refer to the same object. A node that is the owner of a public address in a realm, for example, is the de facto owner of the matching YATT prefix, and is de facto assigned to the IPv6 address derived with the YATT-IID. The other way around, a node that is delegated a YATT prefix is de facto owner of the embedded IPv4 address within the embedded IPv4 realm.

In an IPv4-only environment, a YATT stack may obtain a YADA address pair from DHCPv4, derive a YATT prefix, and use it to configure the local IPv6 stack. As long at the stack generates YATT packets, the packets can be translated statelessly to YADA as a last bump-in-the-stack operation before transmission. In that model, lower-layer protocols such as ARP and DHCP must be supported, but the IP stack can be IPv6-only.

In that case, the node shows as a YADA node, and may talk to a legacy IPv4 stack in a remote realm if the legacy supports the YADA stateful translation. This combination of stateful PAT after the IPv6 stack and stateful NAT after the IPv4 stack allow the 2 stacks to communicate in the YADA/YATT formulations, and traverse IPv4-only and IPv6-only links using the appropriate formulation.

The YATT node may use the YATT prefix to autoconfigure addresses, or it may offer it on an IPv6 stub (tethered) network for address autoconfiguration by attached nodes, protecting the addresses that it keeps for itself using in the Duplicate Address Detection (DAD) procedure. Addresses that are not derived from the YATT-IID will be reachable from IPv6 nodes over an IPv6 network, but not from YADA node, and not over IPv4-only links.

To reach YADA nodes and traverse IPv4, the YATT node may leverage a stateful Port Address Translation (PAT) to transform the original IID in the YATT-IID outside. The stateful PAT operation can happen as a bump-in-the-stack before the YATT-to-YADA stateless translation.

For example, taking a packet in the IPv6 stack 930 with YATT source prefix 932 (IID can be any ID) and destination address 934 (which is another YATT address) and a selected source port 936 with IP payload 934, a host that owns a public address may perform the YATT stateful NAT operation as a bump-in-the-stack 940 below the legacy stack.

The YATT stateful NAT 940 allocates an address from the port pool 942 and translates to the YATT format for the source prefix 932 (now a YATT-ID) and destination address 934, and the source port 936 which is translated to the YATT format.

Figure 10:
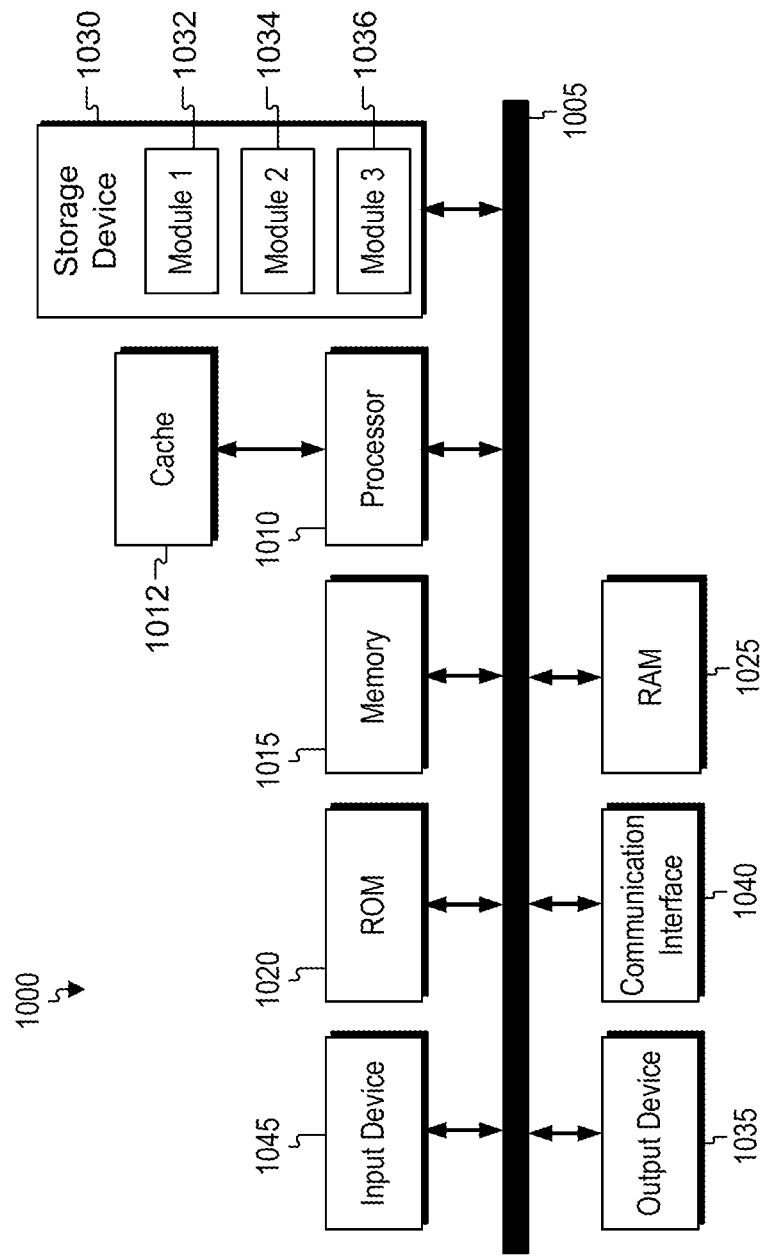
FIG. 10 shows an example of computing system 1000, which can be for example any computing device that can implement components of the system.

FIG. 10 shows an example of computing system 1000, which can be for example any computing device making up [[insert reference to one or more devices discussed earlier in the disclosure]] or any component thereof in which the components of the system are in communication with each other using connection 1005. Connection 1005 can be a physical connection via a bus, or a direct connection into processor 1010, such as in a chipset architecture. Connection 1005 can also be a virtual connection, networked connection, or logical connection.

In some embodiments computing system 1000 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 1000 includes at least one processing unit (CPU or processor) 1010 and connection 1005 that couples various system components including system memory 1015, such as read only memory (ROM) 1020 and random access memory (RAM) 1025 to processor 1010. Computing system 1000 can include a cache of high-speed memory 1012 connected directly with, in close proximity to, or integrated as part of processor 1010.

Processor 1010 can include any general purpose processor and a hardware service or software service, such as services 1032, 1034, and 1036 stored in storage device 1030, configured to control processor 1010 as well as a special-purpose processor where software instructions are incorporated into the actual processor design. Processor 1010 may essentially be a completely self-contained computing system, containing multiple cores or processors, a bus, memory controller, cache, etc. A multi-core processor may be symmetric or asymmetric.

To enable user interaction, computing system 1000 includes an input device 1045, which can represent any number of input mechanisms, such as a microphone for speech, a touch-sensitive screen for gesture or graphical input, keyboard, mouse, motion input, speech, etc. Computing system 1000 can also include output device 1035, which can be one or more of a number of output mechanisms known to those of skill in the art. In some instances, multimodal systems can enable a user to provide multiple types of input/output to communicate with computing system 1000. Computing system 1000 can include communications interface 1040, which can generally govern and manage the user input and system output. There is no restriction on operating on any particular hardware arrangement and therefore the basic features here may easily be substituted for improved hardware or firmware arrangements as they are developed.

Storage device 1030 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 1030 can include software services, servers, services, etc., that when the code that defines such software is executed by the processor 1010, it causes the system to perform a function. In some embodiments, a hardware service that performs a particular function can include the software component stored in a computer-readable medium in connection with the necessary hardware components, such as processor 1010, connection 1005, output device 1035, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method for forwarding packets between parallel IPv4 networks comprising:

encapsulating an Internet Protocol (IP) packet to include an outer header comprising a source node IP address and a destination realm IP address, and an inner header comprising a source realm IP address and a destination node IP address of the IP packet;

routing the IP packet to a shaft spanning a subset of addresses within the source realm and the corresponding addresses in the destination realm;

upon reaching the shaft in the source realm, performing a first swap of the inner header and the outer header of the IP packet, such that after the first swap, the outer header comprises the source realm IP address and the destination realm IP address, and the inner header comprises the source node IP address and the destination node IP address;

forwarding the IP packet inside the shaft from the source realm to the destination realm;

upon reaching the destination realm, performing a second swap of the inner header and the outer header of the IP packet, such that after the second swap, the outer header comprises the source realm IP address and the destination node IP address, and the inner header comprises the source node IP address and the destination realm IP address;

forwarding the IP packet in the destination realm to the destination node; and wherein a globally significant IP address and a locally significant IP address are both configured for use in forwarding the IP packet without address translation.

2. The method of claim 1, wherein one or more of the source realm or the destination realm comprises a realm address in IPv4 format.

3. The method of claim 1, wherein a subset of IP addresses are reserved within the source realm as belonging to the shaft.

4. The method of claim 1, the method further comprising:
once the IP packet reaches the shaft, confirming, by a node that serves the shaft in the source realm, that the source node IP address in the inner header is an address of the source realm;
based on confirming the source node address is within the source realm, forwarding the IP packet to an address within the shaft of the source realm.

5. The method of claim 1, wherein based on the second swap, security is not triggered for the IP packet based on the IP packet being routed in a direction that matches the source node IP address.

6. The method of claim 1, the method further comprising:
resolving the globally significant IP address identifying a realm from a first component of a globally significant name; and
resolving the locally significant IP address identifying a destination node from a second component of a locally significant name.

7. The method of claim 1, wherein transmitting the IP packet comprises utilizing only a globally significant IP address in selecting a next hop node.

8. The method of claim 1, wherein to reach Yet Another Double Address (YADA) nodes in alternate realms, YADA provides a stateful Network Address Translation (NAT) operation that performs an IPV4-to-YADA translation below the legacy stack.

9. A computing apparatus comprising:
a processor; and
a memory storing instructions that, when executed by the processor, configure the computing apparatus to:
encapsulate an Internet Protocol (IP) packet to include an outer header comprising a source node IP address and a destination realm IP address, and an inner header comprising a source realm IP address and a destination node IP address of the IP packet;
route the IP packet to a shaft spanning a subset of addresses within the source realm and the corresponding addresses in the destination realm;
upon reaching the shaft in the source realm, perform a first swap of the inner header and the outer header of the IP packet, such that after the first swap, the outer header comprises the source realm IP address and the destination realm IP address, and the inner header comprises the source node IP address and the destination node IP address;
forward the IP packet inside the shaft from the source realm to the destination realm;
upon reaching the destination realm, perform a second swap of the inner header and the outer header of the IP packet, such that after the second swap, the outer header comprises the source realm IP address and the destination node IP address, and the inner header comprises the source node IP address and the destination realm IP address; forward the IP packet in the destination realm to the destination node; and
wherein a globally significant IP address and a locally significant IP address are both configured for use in forwarding the IP packet without address translation.

10. The computing apparatus of claim 9, wherein one or more of the source realm or the destination realm comprises a realm address in IPV4 format.

11. The computing apparatus of claim 9, wherein a subset of IP addresses are reserved within the source realm as belonging to the shaft.

12. The computing apparatus of claim 9, wherein the instructions further configure the computing apparatus to:
once the IP packet reaches the shaft, confirm, by a node that serves the shaft in the source realm, that the source node IP address in the inner header is an address of the source realm;
based on confirming the source node address is within the source realm, forward the IP packet to an address within the shaft of the source realm.

13. The computing apparatus of claim 9, wherein based on the second swap, security is not triggered for the IP packet based on the IP packet being routed in a direction that matches the source node IP address.

14. The computing apparatus of claim 9, wherein the instructions further configure the computing apparatus to:
resolve the globally significant IP address identifying a realm from a first component of a globally significant name; and
resolve the locally significant IP address identifying a destination node from a second component of a locally significant name.

15. A non-transitory computer-readable storage medium, the computer-readable storage medium including instructions that when executed by a computer, cause the computer to:
encapsulate an Internet Protocol (IP) packet to include an outer header comprising a source node IP address and a destination realm IP address, and an inner header comprising a source realm IP address and a destination node IP address of the IP packet;
route the IP packet to a shaft spanning a subset of addresses within the source realm and the corresponding addresses in the destination realm;
upon reaching the shaft in the source realm, perform a first swap of the inner header and the outer header of the IP packet, such that after the first swap, the outer header comprises the source realm IP address and the destination realm IP address, and the inner header comprises the source node IP address and the destination node IP address;
forward the IP packet inside the shaft from the source realm to the destination realm;
upon reaching the destination realm, perform a second swap of the inner header and the outer header of the IP packet, such that after the second swap, the outer header comprises the source realm IP address and the destination node IP address, and the inner header comprises the source node IP address and the destination realm IP address; forward the IP packet in the destination realm to the destination node; and
wherein a globally significant IP address and a locally significant IP address are both configured for use in forwarding the IP packet without address translation.

16. The computer-readable storage medium of claim 15, wherein one or more of the source realm or the destination realm comprises a realm address in IPV4 format.

17. The computer-readable storage medium of claim 15, wherein a subset of IP addresses are reserved within the source realm as belonging to the shaft.

18. The computer-readable storage medium of claim 15, wherein the instructions further configure the computer to:
once the IP packet reaches the shaft, confirm, by a node that serves the shaft in the source realm, that the source node IP address in the inner header is an address of the source realm;

based on confirming the source node address is within the source realm, forward the IP packet to an address within the shaft of the source realm.

19. The computer-readable storage medium of claim 15, wherein based on the second swap, security is not triggered for the IP packet based on the IP packet being routed in a direction that matches the source node IP address.

20. The computer-readable storage medium of claim 15, wherein the instructions further configure the computer to:
- resolve the globally significant IP address identifying a realm from a first component of a globally significant name; and
- resolve the locally significant IP address identifying a destination node from a second component of a locally significant name.

* * * * *